US010311739B2

(12) United States Patent
Guan et al.

(10) Patent No.: US 10,311,739 B2
(45) Date of Patent: Jun. 4, 2019

(54) SCHEDULING METHOD AND SYSTEM FOR UNMANNED AERIAL VEHICLE, AND UNMANNED AERIAL VEHICLE

(71) Applicant: GUANGZHOU XAIRCRAFT TECHNOLOGY CO., LTD., Guangzhou (CN)

(72) Inventors: Wulie Guan, Guangzhou (CN); Jiaxiang Chen, Guangzhou (CN); Yaolin Huang, Guangzhou (CN)

(73) Assignee: GUANGZHOU XAIRCRAFT TECHNOLOGY CO., LTD, Guangzhou (CN)

( * ) Notice: Subject to any disclaimer, the term of this patent is extended or adjusted under 35 U.S.C. 154(b) by 40 days.

(21) Appl. No.: 15/542,631

(22) PCT Filed: Nov. 3, 2015

(86) PCT No.: PCT/CN2015/093739
§ 371 (c)(1),
(2) Date: Jul. 10, 2017

(87) PCT Pub. No.: WO2016/112733
PCT Pub. Date: Jul. 21, 2016

(65) Prior Publication Data
US 2018/0268719 A1    Sep. 20, 2018

(30) Foreign Application Priority Data

Jan. 13, 2015  (CN) .................... 2015 2 0023417 U
Jan. 23, 2015  (CN) .......................... 2015 1 0036938

(51) Int. Cl.
*G05D 1/10*      (2006.01)
*G07C 5/00*      (2006.01)
(Continued)

(52) U.S. Cl.
CPC ......... *G08G 5/0034* (2013.01); *B64C 39/024* (2013.01); *G05D 1/101* (2013.01);
(Continued)

(58) Field of Classification Search
CPC .. G08G 5/0034; G08G 5/0069; G08G 5/0013; B64C 39/024; B64C 2201/14;
(Continued)

(56) References Cited

U.S. PATENT DOCUMENTS 7,581,702 B2 *  9/2009  Olson et al. ......... G08G 5/0069
                                                    701/2
7,603,212 B2 * 10/2009  Ariyur et al. ........ G05D 1/0274
                                                    701/23
(Continued)

FOREIGN PATENT DOCUMENTS

CN      102637023       8/2012
CN      103337163       10/2013
(Continued)

Primary Examiner — Dale W Hilgendorf
(74) Attorney, Agent, or Firm — Weiss & Moy, P.C.; Jeffrey D. Moy

(57) ABSTRACT

The present disclosure relates to a scheduling method and system for an unmanned aerial vehicle, an unmanned aerial vehicle, and a server for scheduling an unmanned aerial vehicle. The method comprises the following steps: obtaining identity feature data of an unmanned aerial vehicle, and sending the identity feature data to a server; receiving a task instruction sent by the server and matching the identity feature data, wherein the task instruction is generated by the server according to a preset task datasheet; performing a corresponding task according to the task instruction. The above scheduling method and system for the unmanned aerial vehicle, the unmanned aerial vehicle, the server for scheduling the unmanned aerial vehicle can achieve large-scale dispatching of unmanned aerial vehicles and facilitate the use of the unmanned aerial vehicle for people.

9 Claims, 10 Drawing Sheets

(51) Int. Cl.
*G08G 5/00* (2006.01)
*B64C 39/02* (2006.01)

(52) U.S. Cl.
CPC ........... *G07C 5/008* (2013.01); *G08G 5/0013* (2013.01); *G08G 5/0069* (2013.01); *B64C 2201/126* (2013.01); *B64C 2201/14* (2013.01)

(58) Field of Classification Search
CPC ... B64C 2201/136; G07C 5/008; G05D 1/101
See application file for complete search history.

(56) References Cited

U.S. PATENT DOCUMENTS

| | | | | |
|---|---|---|---|---|
| 9,477,226 | B2 * | 10/2016 | Olson et al. | ........... G08G 5/006 |
| 2011/0320068 | A1 | 12/2011 | Lee et al. | |
| 2012/0290154 | A1 * | 11/2012 | Lopez Leones et al. | ................... G08G 5/0082 701/3 |
| 2016/0035224 | A1 * | 2/2016 | Yang et al. | ............. G08G 5/003 701/23 |
| 2016/0116914 | A1 * | 4/2016 | Mucci | ................... G05D 1/101 701/2 |

FOREIGN PATENT DOCUMENTS

| | | | |
|---|---|---|---|
| CN | 103824233 | | 5/2014 |
| CN | 104615143 | | 5/2015 |
| CN | 204316545 | | 5/2015 |
| JP | 2001283400 | | 10/2001 |
| JP | 2003127994 | | 5/2003 |
| JP | 2006001487 | | 1/2006 |
| JP | 2008105591 | | 5/2008 |
| JP | 2011124624 | | 6/2011 |
| WO | WO2016015311 | A1 * | 2/2016 ........... G08G 5/0069 |

* cited by examiner

SCHEDULING METHOD AND SYSTEM FOR UNMANNED AERIAL VEHICLE, AND UNMANNED AERIAL VEHICLE

CROSS REFERENCE TO RELATED APPLICATION

This application claims priority to Chinese Patent Application No. 201510036938.3, entitled "METHOD OF SCHEDULING AN UAV" filed on Jan. 23, 2015, the contents of which are expressly incorporated by reference herein in its entirety.

This application claims priority to Chinese Patent Application No. 201520023417.X, entitled "DATA LINK SYSTEM OF AN UAV BASED ON MOBILE COMMUNICATION NETWORK" filed on Jan. 13, 2015, the contents of which are expressly incorporated by reference herein in its entirety.

FIELD OF THE INVENTION

The present disclosure relates to the field of communication technology, and more particularly relates to a method and a system of scheduling an unmanned aerial vehicle (UAV), the UAV, and the server of scheduling the UAV.

BACKGROUND OF THE INVENTION

The data transmission and control for the conventional UAV is generally performed by RF digital transmission modules or cellular mobile communications. However the RF digital transmission modules is limited by distance and terrain constraints, which requires that there is no obstacle between ground and the UAV. What's more, a data communication is merely performed via the cellular mobile communication, and the UAV is merely controlled on the specified device.

In the conventional way, an aircraft is controlled by the radio remote, directly, or by the ground device via the radio digital transmission module or mobile cellular network. However, due to the processing capacity of the ground control is restricted, a small number of the UAV can be controlled, thus the usage of the UAV is restricted for people and the large-scale scheduling of the UAV cannot be performed.

SUMMARY OF THE INVENTION

The present disclosure provides a method and a system of scheduling a UAV, the UAV, and a server of scheduling the UAV to direct to large-scale scheduling the UAV.

A method of scheduling an unmanned aerial vehicle (UAV) includes the following steps of:
obtaining identity characteristic data of the UAV, and sending the identity characteristic data to a server;
receiving a task instruction sent by the server and matching the identity characteristic data, wherein the task instruction is generated by the server according to a preset task data table; and
performing a task corresponding to the task instruction.

A method of scheduling a UAV includes the following steps of:
receiving identity characteristic data sent by the UAV;
obtaining a task data table matching the UAV according to the identity characteristic data;
generating a task instruction according to the task data table; and
sending the task instruction to the UAV.

A method of scheduling a UAV includes the following steps of:
obtaining, by a UAV, identity characteristic data thereof, and sending the identity characteristic data to a server;
receiving, by the server, the identity characteristic data sent by the UAV;
obtaining, by the server, a task data table matching the UAV according to the identity characteristic data;
generating, by the server, a task instruction according to the task data table;
sending, by the server, the task instruction to the UAV; and
receiving, by the UAV, the task instruction sent by the server, and performing a task corresponding to the task instruction.

A UAV includes a flight control module used to store an identity ID of the UAV and a communication module in communication with the flight control module and used to obtain and store a current IP address;
the communication module is further used to send the identity ID and the current IP address to a server and receive a task instruction sent by the server and matching the identity ID, wherein the task instruction is generated by the server according to a preset task data table;
the flight control module is further used to receive the task instruction transmitted by the communication module and perform a task corresponding to the task instruction.

A server of scheduling a UAV includes a communication service module used to receive identity characteristic data sent by the UAV and a back-end application module in communication with the communication service module;
the back-end application module is used to obtain a task data table matching the UAV according to the identity characteristic data, and generate a task instruction according to the task data table and send the task instruction to the UAV via the communication service module.

A system of scheduling a UAV includes the Internet, the UAV described above and the server of scheduling the UAV described above, the UAV is in communication with the server via the Internet.

DETAILED DESCRIPTION OF THE EMBODIMENTS

In order to make the above objects, features and advantages of the present disclosure become more apparent, the specific embodiments will be described in detail in combination with the accompanying drawings. It should be noted that the specific embodiments described herein are merely illustrative and are not intended to limit the invention.

Figure 1:
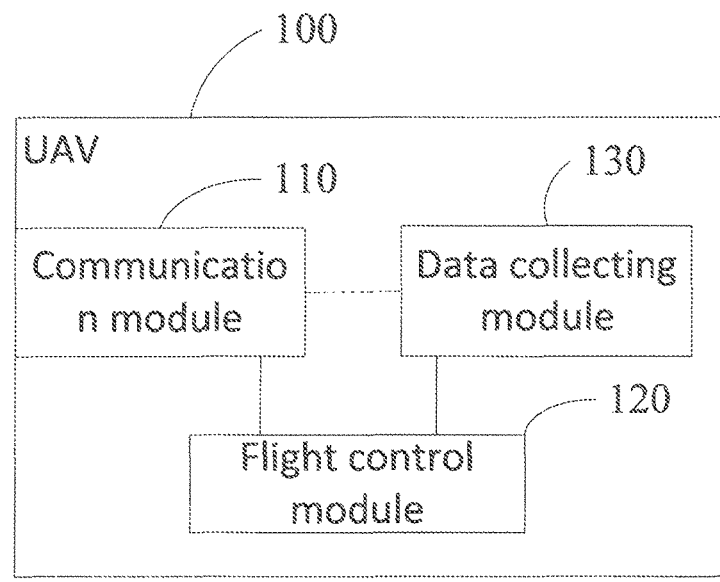
FIG. 1 is a block diagram of a UAV according to an embodiment.

As shown in FIG. 1, according to one embodiment, a UAV 100 includes a communication module 110, a flight control module 120, and a data collecting module 130. The flight control module 120 is in communication with the communication module 110 and the data collecting module 130, respectively.

The communication module 110 is used to obtain and store a current IP address.

Specifically, the UAV 100 accesses the Internet via the communication module 110 and establishes communication with the server. The UAV 100 is assigned with an IP address after having access to the Internet. The communication module 110 obtains and stores the current IP address. The communication module 110 also can detect disconnection and reconnect, thus it can deal with a situation where the network or signal is disconnected when the network or the signal blind zone is encountered during data transmission.

The flight control module 120 is used to store an identity ID of the UAV.

Specifically, each UAV 100 has its own identity ID, such that the server is facilitated to recognize the identity of the UAV 100 and send a task instruction according to the identity ID. The identity ID is stored in the flight control module 120.

The communication module 110 is further used to send the identity ID and the current IP address to the server and receive the task instruction sent by the server and matching the identity ID, and the task instruction is generated by the server according to a preset task data table.

Specifically, the communication module 110 sends the identity ID and the current IP address of the UAV 100 to the server. After receiving the identity ID and the current IP address of the UAV 100, the server generates the task instruction according to the preset task data table and send the task instruction to the UAV 100 corresponding to the task instruction. The communication module 110 of the UAV 100 receives the task instruction. The task data table is shown as follows:

| Identity ID | Waypoint | Waypoint type | Waypoint data |
|---|---|---|---|

The task data table may include identity ID, waypoint, waypoint type, and waypoint data, and records an association relationship between them.

The identity ID represents different UAVs 100.

The waypoints can be represented by serial numbers, such as waypoint 1, waypoint 2, waypoint 3, and so on, and different waypoints correspond to different serial numbers.

The waypoint type can be a take-off location, a location of the landing point, a geographical location of the conventional waypoint, a location of the implementation point and so on. There are different waypoints and the waypoint types corresponding to the waypoints for different identity ID.

The waypoint data is the specific data that is operated or implemented by the waypoint UAV 100 at the waypoint. The waypoint data can include time, latitude and longitude coordinates of the waypoint, an altitude of the waypoint, the operating parameters of the UAV 100 flying to the waypoint, and the actions required to operate by the UAV 100 at the waypoint. Different waypoint types correspond to different waypoints, and there may be one or more different waypoints data for different waypoints. The operating parameters of the UAV 100 flying to the waypoint may include a horizontal speed, a climbing speed and a heading parameter, and so on. The heading parameter refers to a course when the UAV 100 is flying, for example, the course is directed to north or latitude and longitude coordinates and so on. The actions required to be operated by the UAV 100 at the waypoint may include passing by, hovering, looking around, interest point surrounding, and peripheral operations. The passing by refers to the UAV 100 flies to a next waypoint immediately after arriving at the waypoint. Hovering refers to the UAV 100 stops at the waypoint. Looking around refers to the UAV 100 operates the action of looking around the surroundings after arriving at the waypoint. Interest point represents a geographic location information including latitude and longitude coordinates and altitude. The interest point surrounding refers to the UAV 100 can fly surrounding the interest point according to a preset operating parameters. The peripheral operation is related to the equipment carried by the UAV 100, such as taking pictures, recording, collecting the sensor data to the waypoint and so on.

The server receives the identity ID and the current IP address sent by the UAV 100 via the communication module 110 and inquires the preset task data table according to the identity ID. When having detected the same portion between the identity ID of the task data table and the received identity ID, generating the task instruction according to the task data table corresponding to the identity ID. The task instruction includes specific data that required to be operated or implemented by the current UAV 100, and the specific data is obtained according to the task data table. Then sending the task instruction to the UAV 100 according to the current IP address of the UAV 100, and the UAV 100 performs a task corresponding to the task instruction.

The flight control module 120 is further used to receive the task instruction transmitted by the communication module 110 and perform a task corresponding to the task instruction.

Specifically, the flight control module 120 performs the task corresponding to the task instruction sent by the server, which includes various preset operations in the task data table corresponding to the UAV 100. For example, according to the task instruction, the UAV 100 can perform tasks of flying, suspension, continuing, termination, forced landing, returning, passing by, hovering, looking around, interest point surrounding, taking pictures, taking videos, collecting sensor data and so on. The UAV 100 can also adjust real-time attitude and flight speed according to the task instructions. The server can control the corresponding UAV 100 to perform corresponding tasks in real-time, so as to achieve the large-scale scheduling of the UAV.

The data collecting module 130 is used to obtain current flight status data.

Specifically, the current flight status data includes hardware status data, real-time location data, real-time motion data, real-time attitude data, sensor data, and self-test data. The hardware status data refers to the status data of the component portions of the UAV 100, which includes a battery voltage, a motor speed, a signal quality of the data transmission, and so on. The real-time location data includes latitude and longitude of current location of the UAV 100, altitude, GPS accuracy, number of satellites and UTC (Universal Time Coordinated time) of the UAV's current location. The real-time motion data includes the operating speed of the UAV 100, the climbing/landing speed, the heading and so on. The real-time attitude data include pitch and roll angles. The sensor data includes accelerometers, gyroscopes, thermometers, and ultrasonic measurements. The self-test data refers to the data obtained by the UAV 100 according to the result of detecting the own data, such as whether the battery is undervoltage, the sensor is overloaded, or the real-time motion data is within the normal range.

The data collecting module 130 is further used to send the current flight status data to the server via the communication module 110.

Specifically, the data acquisition module 130 may include a master chip, a gyroscope, an acceleration sensor, a geomagnetism sensor, a barometric temperature sensor, and a GPS satellite positioning device. The master chip is connected to the gyroscope, the acceleration sensor, the geomagnetic sensor, the barometric temperature sensor, and the GPS satellite positioning device respectively. The gyroscope, the acceleration sensor, the geomagnetic sensor, the barometric temperature sensor and the GPS satellite positioning device are used to obtain the hardware status data, the real-time location data, the real-time motion data and the real-time attitude data and the sensor data of the UAV 100. The gyroscope and acceleration sensor can sense the three-dimensional angular velocity signal and the three-dimensional acceleration signal of the UAV 100, and obtain the real-time attitude data of the UAV via the master chip. The master chip can obtain the current position data according to the geomagnetic sensor, the GPS satellite positioning device and the barometric temperature sensor, and the GPS satellite positioning device. The master chip corrects the real-time attitude data of the UAV 100 to obtain the real-time attitude data with high reliability.

The master chip is also connected to the communication module 110 and used to send the obtained current flight state data to the server via the communication module 110. The server performs real-time monitoring to the UAV 100 according to the flight status data of the UAV 100. When the current flight state data is detected to be abnormal, the server sends an early warning and facilitates its adjustment and processing in time.

The forgoing UAV sends the obtained identity characteristic data to the server, and the server generates the task instruction according to the preset task data table matching the UAV. The server sends a control instruction according to the identity characteristic data of the UAV, thus enabling the server to control the UAV to perform a task corresponding to the control instruction.

According to one embodiment, the forgoing UAV and the data collecting module are further used to detect whether the hardware status data, the real-time location data, the real-time motion data, the real-time attitude data, and the sensor data are within the preset normal value range and generate the self-test data according to a detecting result.

Specifically, the data collecting module 130 compares the obtained hardware status data, the real-time location data, the real-time motion data, the real-time attitude data, and the sensor data with the normal value range corresponding to the preset data, and generates the self-test data according to the detecting result. The self-test data can include whether the battery is undervoltage, the sensor is overloaded, or real-time motion data is within the normal range. The master chip in the data collecting module 130 may send the self-test data of the UAV 100 to the server via the communication module 110.

The data collecting module 130 is further used to prompt that the flight status is abnormal when having determined the hardware status data, the real-time location data, the real-time motion data, the real-time attitude data, and the sensor data are not within the preset normal value range, thus facilitating its adjustment and processing. When the self-test data is abnormal, if the abnormal state is small, such as the flight speed is too fast, the pitch angle is too large, the UAV 100 can adjust the operating parameters to make it normal. When the abnormal state is large, such as yawing, entering into a sensitive area and so on, which is determined by the self-test data uploaded by the server. Then adjustment instructions are issued by the server, such as stop flying, changing routes, returning and so on.

The flight control module 120 is further used to perform a take-off operation and receive the task instruction sent by the server in real time, and perform the task corresponding to the task instruction when determining the UAV 100 is in a normal take-off status.

Specifically, the server can preload the task data table, or load the task data table one by one or update the task data table in real time according to an actual application environment. The two methods can be selected according to the actual application scene and network environment of the UAV 100. Generally, when the task performed by the UAV 100 is fixed or the network environment is not well, the server can adopt the preloading mode to load corresponding task data table at one time. Then generating the task instruction corresponding to the task data table matching the UAV 100 and sending the task instruction to the UAV 100. The UAV 100 performs the task corresponding to the task instruction. When the UAV 100 task is not fixed, the server can adopt the method of loading the task data table one by one or updating the task data table in real time. For example, the task of the UAV 100 is to track a beacon on the ground, by which the real-time location data and motion data can be fed back to the server after the beacon is connected to the Internet. The server updates the task data table in real time according to the real-time location data and the real-time motion data, and generates a real-time task instruction that is sent to the corresponding UAV 100, and the UAV 100 receives the task instruction and tracks the beacon according to the task instruction.

The flight control module 120 is further used to receive a rejection take-off instruction sent by the server via the communication module 110 and prompt a user according to the rejection take-off instruction when determining the UAV 100 is in an abnormal take-off status.

Figure 2:
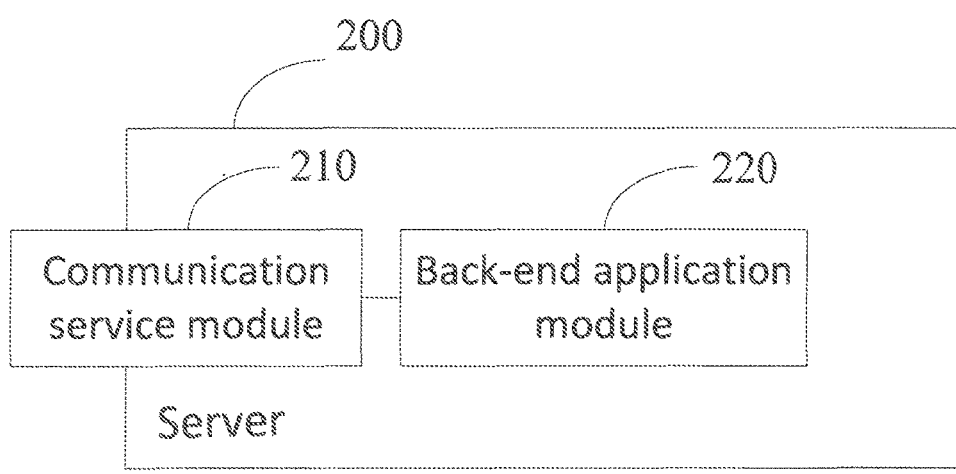
FIG. 2 is a block diagram of a server of scheduling the UAV according to an embodiment.

As shown in FIG. 2, according to one embodiment, a server 200 of scheduling the UAV includes a communication service module 210 and a back-end application module 220. The communication service module 210 is in communication with the back-end application module 220.

The communication service module 210 is used to receive identity characteristic data sent by the UAV 100.

Specifically, the identity characteristic data includes an identity ID and a current IP address of the UAV 100. The server 200 accesses the Internet via the communication service module 210, thus being in communication with the UAV 100. The communication service module 210 receives the identity ID and the current IP address sent by the UAV 100.

The back-end application module 220 is used to obtain a task data table matching the UAV 100 according to the identity characteristic data, and generate a task instruction according to the task data table and send the task instruction to the UAV 100 via the communication service module 210.

Specifically, the back-end application module 220 inquires the task data table according to the received identity ID and finds the same portion between the identity ID of the task data table and the received identity ID. Then generating the task instruction according to the task data table corresponding to the identity ID and sending the task instruction to the UAV 100 according to the current IP address of the UAV 100, and the UAV 100 performs a task corresponding to the task instruction.

According to one embodiment, the communication service module 210 is further used to receive current flight status data sent by the UAV 100.

Specifically, the current flight status data includes hardware status data, real-time location data, real-time motion data, real-time attitude data, sensor data, and self-test data.

The back-end application module 220 is further used to store the current flight status data and send an early warning to the UAV 100 when detecting the current flight status data is abnormal.

Specifically, the back-end application module 220 may send the early warning to the UAV 100 according to the current flight status data of the UAV 100. The UAV 100 sends the current flight state data to the server 200 at regular intervals, which may be a preset time interval, such as 5 seconds (s), 10 s, 1 minute (min), and so on, so as to ensure that the current flight state data is real-time. The back-end application module 220 performs monitoring and sending the early warning to the UAV 100 according to the current flight status data, which facilitates the instant adjustment of the UAV 100 and exception handling, for example, when the UAV 100 has yawed, has entered into the sensitive area, or has been in the abnormal take-off state. When the back-end application module 220 detects that the current flight state data of the UAV 100 is abnormal, instructions may be issued to the UAV 100 at any time for suspension, termination, returning or forced landing.

The back-end application module 220 is further used to generate a preset route according to the task data table matching the UAV 100, and calculate a distance between the UAV 100 and the preset route according to the real-time location data of the UAV 100, and send the early warning to the UAV 100 when the distance is greater than a preset threshold.

Specifically, the back-end application module 220 generates a preset route according to the waypoint data matching the identity ID of the UAV 100 in the task data table to calculate the distance between the UAV 100 and the preset route. For example, the UAV 100 is at the flight point i, then the geographic segment L (i, i−1) can be obtained, the preset threshold can be 20, 30 meters and other values, and then calculate the distance between the geographical segment and the preset route, or obtain the coordinates of the flight point directly, and calculate the distance between the UAV 100 and the preset route according to a distance algorithm of point to line. When the distance is greater than the threshold, the early warning is sent to the UAV 100. When the UAV 100 has yawed, the server can issue an adjustment instructions, or the corresponding UAV is adjusted manually.

The back-end application module 220 is further used to obtain a preset sensitive area, and determine whether the real-time location of the UAV is within or approaching the sensitive area and send a sensitive area early warning to the UAV.

Specifically, the server 200 may establish a sensitive area database to store the preset sensitive area including an airport, a military zone and so on. The back-end application module 220 can calculate the distance (in meters) between the real-time location of the UAV 100 and the sensitive area by taking advantage of a distance algorithm between points and points and a distance algorithm between points and lines in geometric matrices and the Earth's radius value. When the distance of the UAV 100 is smaller than the preset distance, it is considered that the UAV 100 is approaching the sensitive area, where the preset distance can be 10, 5 meters and so on. When the UAV 100 is within or approaching the sensitive area, the early warning is sent to the UAV 100. The back-end application module 220 may also issue a temporary task instruction to the UAV 100 to change the original route away from the sensitive area. For example, the original route of the UAV 100 is A-B, which will pass through the sensitive area in the half way, a temporary waypoint C can be added, so that the route becomes A-C-B, thus avoiding the sensitive area. When the UAV 100 is within or approaching the sensitive area, the server can issue the adjustment instructions automatically, or the corresponding UAV is adjusted manually.

The back-end application module 220 is further used to determine the UAV 100 is in an abnormal take-off status and send a rejection take-off instruction to the UAV 100 via the communication service module 210; or else generate the task instruction according to the task data table matching the UAV 100 and send the task instruction to the UAV 100 via the communication service module 210.

Specifically, the abnormal take-off status includes one or more of the following: (1) The UAV being in a non-execution task status determined according to the task data table, i.e. there is no data in the task data table matching the UAV. (2) The UAV being not in a take-off area calculated and determined according to current location data of the UAV. The distance between the current location data of the UAV 100 and the take-off point is calculated according to the latitude and longitude information, the waypoint type of which is take-off point geographical location, corresponding to the UAV 100 in the task data table. When the distance is smaller than the preset range, the preset range may be 5, 3 meters, and so on, indicating that the UAV 100 is within the take-off area, otherwise the UAV 100 is not within the take-off area. (3) The UAV 100 being in the sensitive area calculated and determined according to the current location data of the UAV 100. (4) The self-test data of the UAV being abnormal, such as abnormal operating voltage, abnormal temperature and so on.

When the UAV 100 is in the normal take-off status, the back-end application module 220 may schedule the specified UAV 100 to orderly perform the corresponding tasks according to the task data table matching the UAV 100.

According to one embodiment, the back-end application module is further used to obtain a last IP address of the UAV 100 in a preset communication address table according to the identity ID of the UAV 100, and is further used to determine that the current IP address is the same as the last IP address and continue to receive the current IP address sent by the UAV 100 via the communication service module 210; or else update the communication address table.

Specifically, during the flying of the UAV, the current IP address of the UAV 100 may be changed when a base station is switched, so that the UAV 100 needs to obtain its current IP address in real time and send the current IP address to the server 200. The server 200 receives the current IP address in real time via the communication service module 210. The communication address table records the association relationship between the identity ID of the UAV 100 and the current IP address. The communication address table is shown as follows:

| Identity ID | IP address |
| --- | --- |

When the back-end application module 220 detects that the current IP address sent by the UAV 100 is different from the IP address corresponding to its identity ID in the communication address table, thereby updating the communication address table. The server 200 sends the task instruction according to the current IP address of the UAV 100, so as to control the specified UAV to perform the task corresponding to the task instruction.

According to one embodiment, the communication service module 210 is used to receive a control instruction for the UAV sent by a terminal.

Specifically, the terminal can be mobile phones, laptops, tablet PC, desktop computers and other terminal equipment. The terminal can be in communication with the server 200 via the Internet and send the control instruction of the UAV 100 to the server to achieve the scheduling of the UAV.

The back-end application module is further used to determine the identity characteristic data of the UAV 100 according to the control instruction and send the control instruction to the UAV 100 corresponding to the determined identity characteristic data of the UAV 100 via the communication service module 210.

Specifically, the back-end application module 220 determines the identity ID and the current IP address of the UAV 100 according to the control instruction sent by the terminal and sends the control instruction to the corresponding UAV 100 through the current IP address of the UAV 100 to achieve the function of monitoring and scheduling the UAV via the terminal, which greatly facilitates the usage of the UAV for people.

Figure 3:
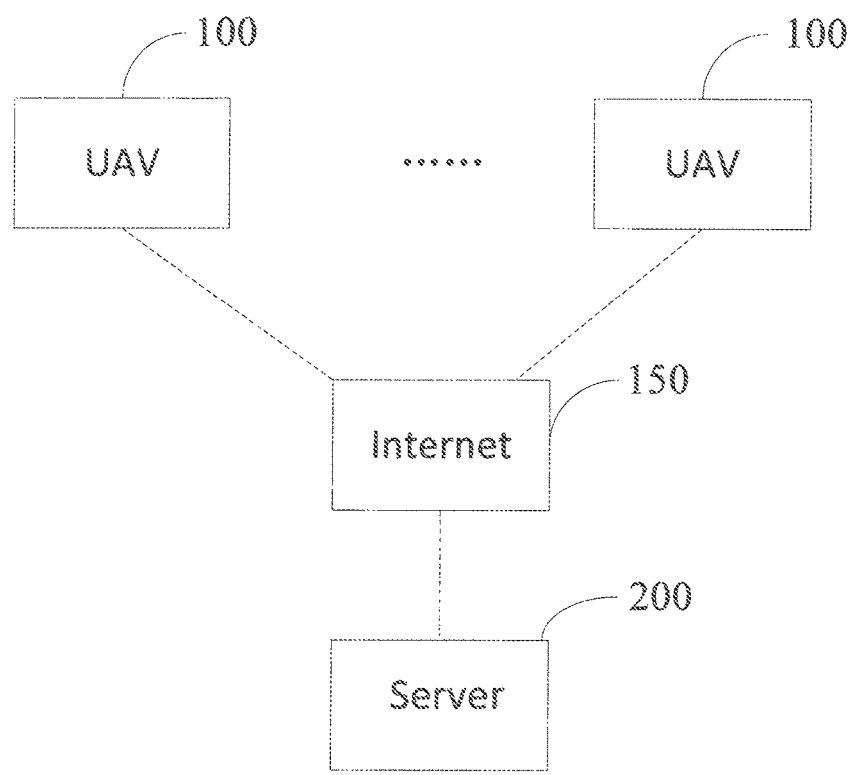
FIG. 3 is a block diagram of a system of scheduling the UAV according to an embodiment.

As shown in FIG. 3, according to one embodiment, a system of scheduling a UAV includes one or more foregoing UAV 100, the Internet 150, and the server 200. The internet 150 is in communication with the UAV 100 and the server 200, respectively, and the UAV 100 is in communication with the server 200 via the Internet 150.

According to the foregoing system of scheduling the UAV, the UAV and the server are in communication with each other via the Internet, i.e., where there is a network, where the server can monitor and schedule the UAV communicating with the server without distance limit, which enables to monitor and schedule the UAV to perform the corresponding task in large-scale.

Figure 4:
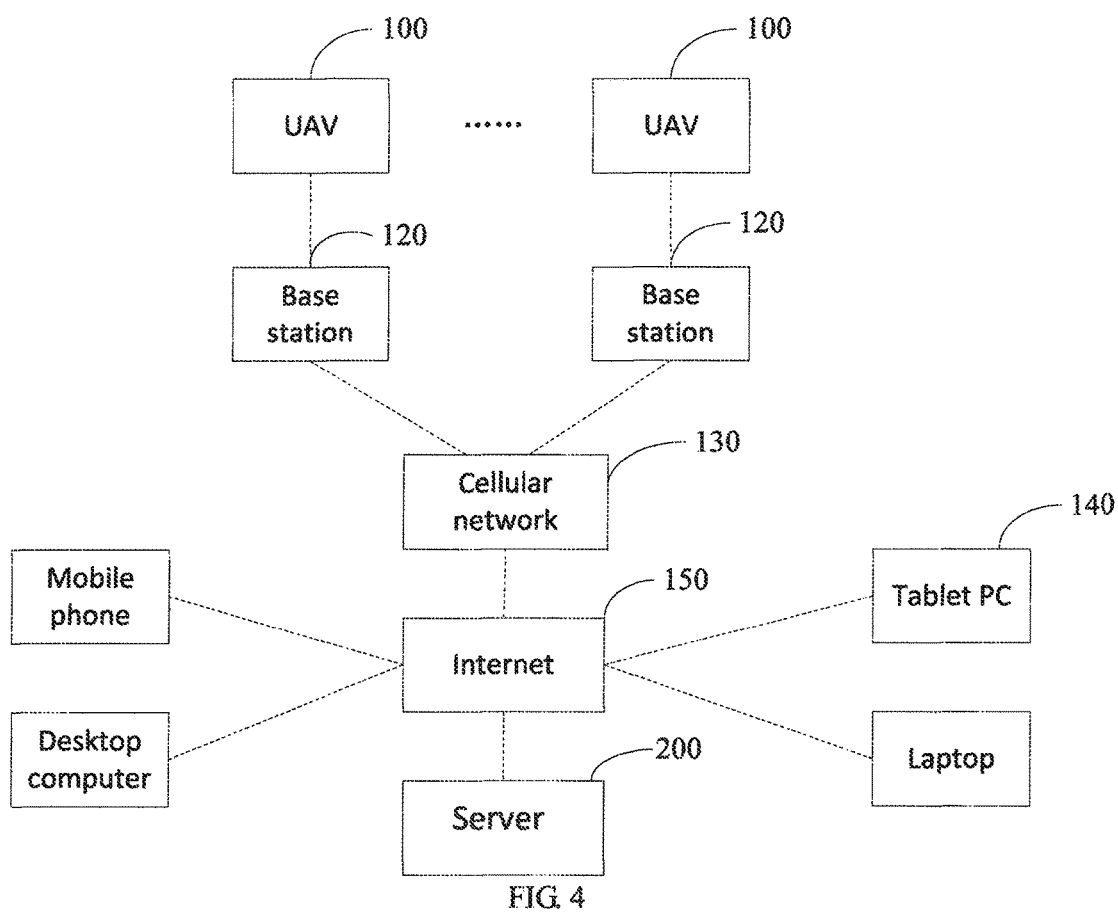
FIG. 4 is a block diagram of a system of scheduling the UAV according to another embodiment.

As shown in FIG. 4, according to an alternative embodiment, a system of scheduling a UAV includes one or more foregoing UAV 100, the Internet 150, and the server 200, which further includes a base station 120, a cellular network 130, and a terminal 140.

Specifically, the UAV 100 is in communication with the cellular network 130 via the base station 120, the cellular network 130 is in communication with the Internet 150, and the server 200 is in communication with the cellular network 130 and the UAV 100 via the Internet 150. The terminal 140 is in communication with the server 200 via the Internet 150.

The cellular network 130 may be a mobile communication network such as a GPRS, 3G, 4G, 5G network.

The terminal 140 sends a control instruction of the UAV to the server, the server receives the control instruction and send the control instruction to a corresponding UAV 100, and the UAV 100 performs a task corresponding to the control instruction.

Figure 5:
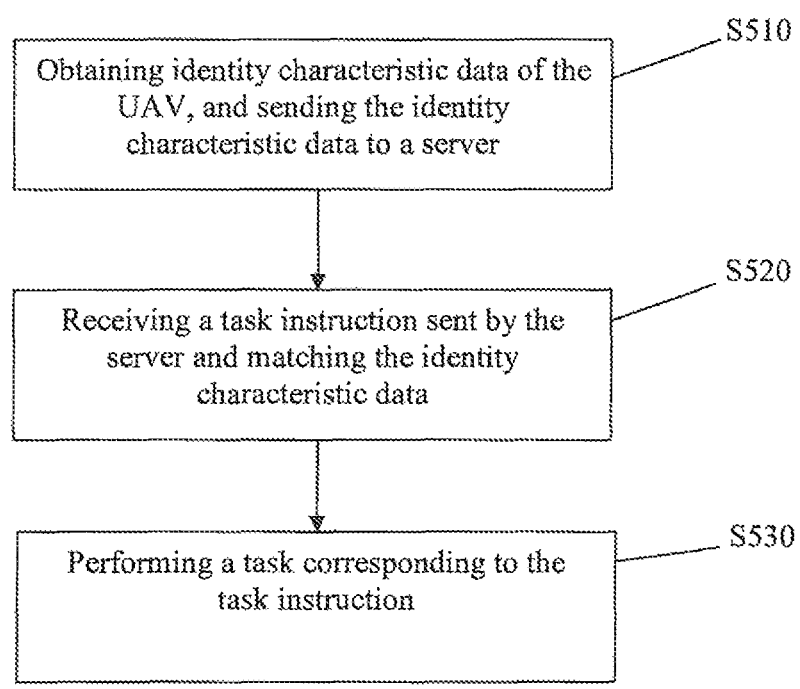
FIG. 5 is a flowchart of a method of scheduling the UAV according to an embodiment.
Figure 6:
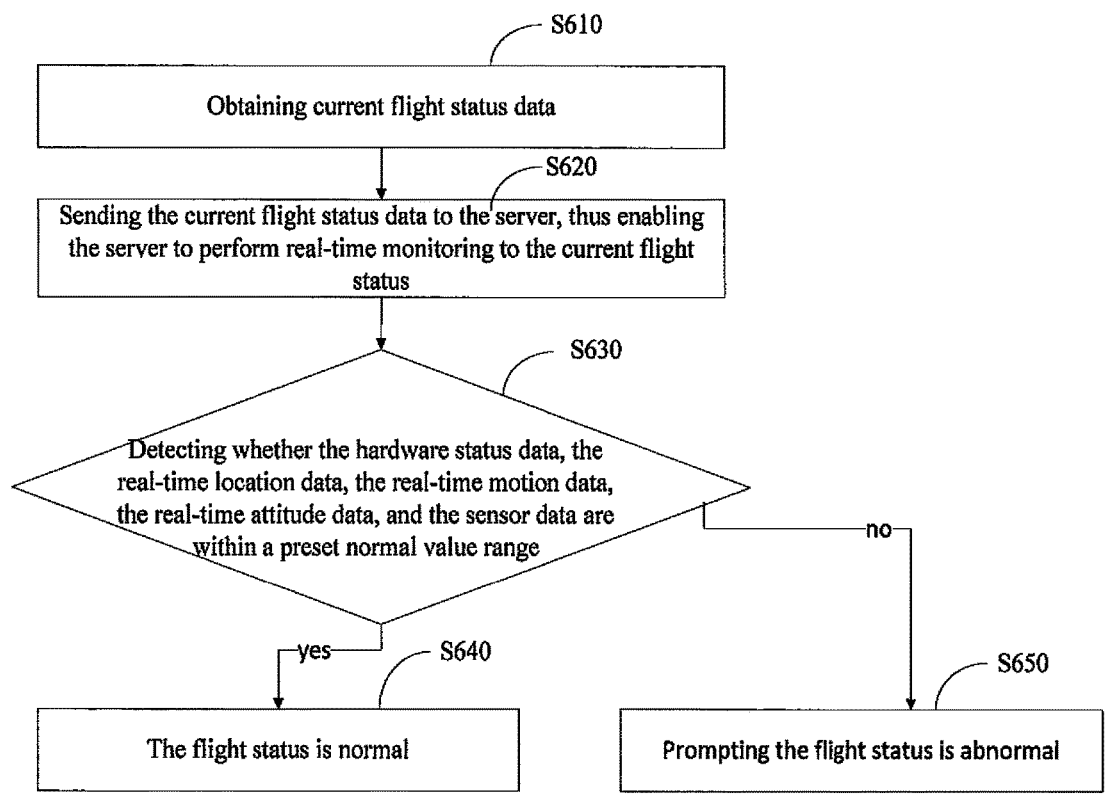
FIG. 6 is a flowchart illustrating the server sends a current flight status data to the server according to an embodiment.

As shown in FIG. 5, According to one embodiment, a method of scheduling a UAV described from the UAV includes the following steps of:

In step S510: identity characteristic data of the UAV is obtained and sent to a server.

Specifically, the identity characteristic data includes an identity ID and a current IP address. Each UAV has its own identity ID, which facilitates identifying the identity and sending a task instruction by the server according to the identity. The UAV is in communication with the server after having access to the Internet. The IP address is distributed to the UAV after the UAV is in communication with the Internet. The UAV sends the identity ID and the current IP address to the server.

In step S520: a task instruction sent by the server and matching the identity characteristic data is received.

Specifically, the UAV receives the task instruction sent by the server and matching the identity ID of the UAV, and the task instruction is generated according to the preset task data table. The server generates the task instruction according to the preset task data table after receiving the identity ID and the current IP address of the UAV, and sends the task instruction to the corresponding UAV.

| Identity ID | Waypoint | Waypoint type | Waypoint data |
| --- | --- | --- | --- |

The task data table can include identity ID, waypoint, waypoint type, and waypoint data, and record an association relationship between them.

The identity ID represents the different UAV 100.

The waypoints can be represented by serial numbers, such as waypoint 1, waypoint 2, waypoint 3, and so on, and different waypoints correspond to different serial numbers.

The waypoint type can be a take-off location, a location of the landing point, a geographical location of the conventional waypoint, a location of the implementation point and so on. There are different waypoints and the waypoint types corresponding to the waypoints for different identity ID.

The waypoint data is the specific data that is operated or implemented by the waypoint UAV. The waypoint data can include time, latitude and longitude coordinates of the waypoint, an altitude of the waypoint, the operating parameters of the UAV flying to the waypoint, and the actions required to operate by the UAV at the waypoint. Different waypoint types correspond to different waypoints, and there may be one or more different waypoints data for different waypoints. The operating parameters of the UAV flying to the waypoint may include a horizontal speed, a climbing speed and a heading parameter, and so on. The heading parameter refers to a course when the UAV is flying, for example, the course is directed to north or latitude and longitude coordinates and so on. The actions required to be operated by the UAV at the waypoint may include passing by, hovering, looking around, interest point surrounding, and peripheral operations. The passing by refers to the UAV flies to a next waypoint immediately after arriving at the waypoint. Hovering refers to the UAV stops at the waypoint. Looking around refers to the UAV operates the action of looking around the surroundings after arriving at the waypoint. Interest point represent a geographic location information including latitude and longitude coordinates and altitude. The interest point surrounding refers to the UAV can fly surrounding the interest point according to a preset operating parameters. The peripheral operation is related to the equipment carried by the UAV, such as taking pictures, recording, collecting the sensor data to the waypoint and so on.

The server receives the identity ID and the current IP address sent by the UAV via the communication module and inquires the preset task data table according to the identity ID. When having detected the same portion between the identity ID of the task data table and the received identity ID, generating the task instruction according to the task data table corresponding to the identity ID. The task instruction includes specific data that required to be operated or implemented by the current UAV, and the specific data is obtained according to the task data table. Then sending the task instruction to the UAV according to the current IP address of the UAV, and the UAV performs a task corresponding to the task instruction.

In step 530: the task corresponding to the task instruction is performed.

Specifically, the UAV performs the task corresponding to the task instruction sent by the server, which includes various preset operations in the task data table corresponding to the UAV. For example, according to the task instruction, the UAV 100 can perform tasks of flying, suspension, continuing, termination, forced landing, returning, passing by, hovering, looking around, interest point surrounding, taking pictures, taking videos, collecting sensor data and so on. The UAV 100 can also adjust real-time attitude and flight speed according to the task instructions.

According to one embodiment, after obtaining the identity characteristic data of the UAV and sending the identity characteristic data to the server, the method further comprises the following steps of:

In step S610: current flight status data is obtained.

In step S620: the current flight status data is sent to the server, thus enabling the server to perform real-time monitoring to the current flight status.

Specifically, the current flight status data includes hardware status data, real-time location data, real-time motion data, real-time attitude data, sensor data, and self-test data. The hardware status data refers to the status data of the component portions of the UAV 100, which includes a battery voltage, a motor speed, a signal quality of the data transmission, and so on. The real-time location data includes latitude and longitude of current location of the UAV 100, altitude, GPS accuracy, number of satellites and UTC (Universal Time Coordinated time) of the UAV's current location. The real-time motion data includes the operating speed of the UAV 100, the climbing/landing speed, the heading and so on. The real-time attitude data include pitch and roll angles. The sensor data includes accelerometers, gyroscopes, thermometers, and ultrasonic measurements. The self-test data refers to the data obtained by the UAV 100 according to the result of detecting the own data, such as whether the battery is undervoltage, the sensor is overloaded, or the real-time motion data is within the normal range. The server performs real-time monitoring to the UAV according to the flight status data of the UAV, and sends an early warning to the UAV when detecting the current flight status data is abnormal, thus facilitating the adjustment and processing in time.

In step S630: whether the hardware status data, the real-time location data, the real-time motion data, the real-time attitude data, and the sensor data are within a preset normal value range are detected, and the flight status is normal is detected; or else the step S650 is performed.

Specifically, the UAV compares the obtained hardware status data, the real-time location data, the real-time motion data, the real-time attitude data, and the sensor data with the normal value range corresponding to the preset data, and generates the self-test data according to the detecting result. The self-test data can include whether the battery is undervoltage, the sensor is overloaded, or real-time motion data is within the normal range.

The UAV prompts the flight status is abnormal when having determined the hardware status data, the real-time location data, the real-time motion data, the real-time attitude data, and the sensor data are not within the preset normal value range, thus facilitating its adjustment and processing. When the self-test data is abnormal, if the abnormal state is small, such as the flight speed is too fast, the pitch angle is too large, the UAV 100 can adjust the operating parameters to make it normal. When the abnormal state is large, such as yawing, entering into a sensitive area and so on, which is determined by the self-test data uploaded by the server. Then adjustment instructions are issued by the server, such as stopping fly, changing routes, returning and so on.

In step S640: the flight status is normal.

In step S650: the flight status is abnormal is prompted.

In an alternative embodiment, the foregoing method of scheduling the UAV further includes the following steps of:

(a) A take-off operation is performed and the task instruction sent by the server is received in real time, and the task corresponding to the task instruction is performed when determining the UAV is in a normal take-off status;

Specifically, performing a take-off operation and receiving the task instruction sent by the server in real time when determining the UAV is in a normal take-off status. The server can preload the task data table, or load the task data table one by one or update task data table in real time according to an actual application environment. The two methods can be selected according to the actual application scene and network environment of the UAV. Generally, when the task performed by the UAV 100 is fixed or the network environment is not well, the server can adopt the preloading mode to load corresponding task data table at one time. Then generating the task instruction corresponding to the task data table matching the UAV and sending the task instruction to the UAV. The UAV 100 performs the task corresponding to the task instruction.

When the UAV 100 task is not fixed, the server can adopt the method of loading the task data table one by one or updating the task data table in real time. For example, the task of the UAV is to track a beacon on the ground, by which the real-time location data and motion data can be fed back to the server after the beacon is connected to the Internet. The server updates the task data table in real time according to the real-time location data and the real-time motion data, and generates a real-time task instruction that is sent to the corresponding UAV, and the UAV receives the task instruction and tracks the beacon according to the task instruction.

(b) A rejection take-off instruction sent by the server is received and a user is prompted according to the rejection take-off instruction when determining the UAV is in an abnormal take-off status.

Specifically, receiving the rejection take-off instruction sent by the server when determining the UAV is in an abnormal take-off status and adjusting the UAV in normal status after prompting the user.

According to the foregoing method of scheduling the UAV, the server can preload the task data table or load the task data table in real time, which is beneficial for scheduling the UAV to perform corresponding task, thus facilitating the monitoring and scheduling of the UAV.

Figure 7:
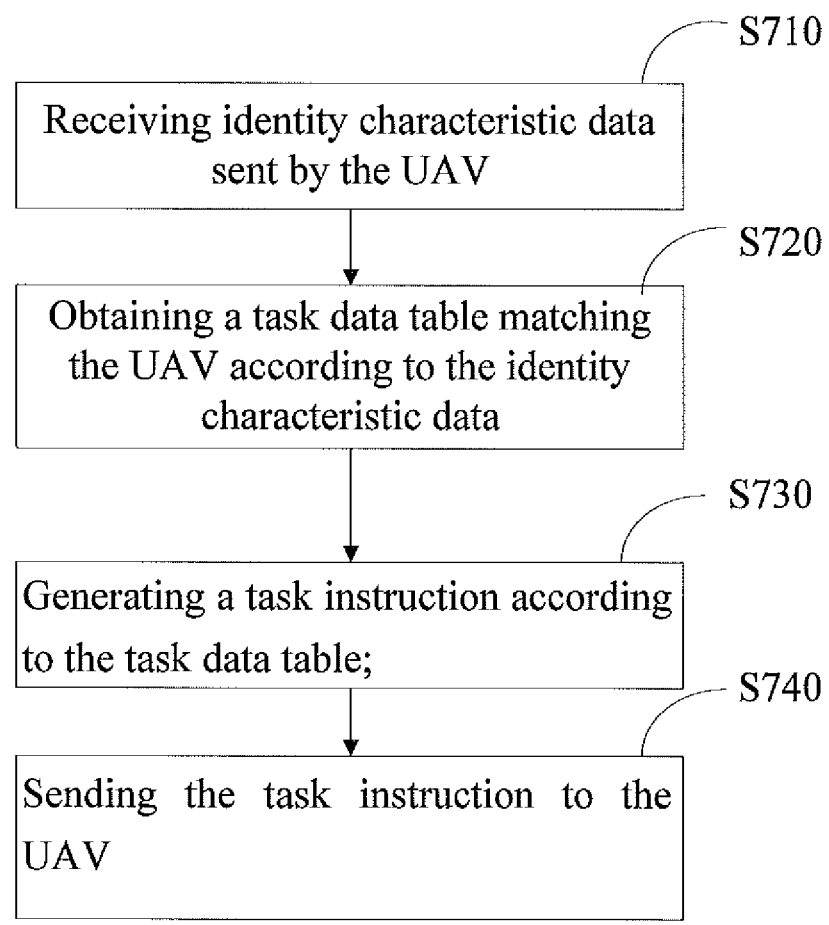
FIG. 7 is a flowchart of a method of scheduling the UAV according to another embodiment.

As shown in FIG. 7, According to one embodiment, a method of scheduling a UAV described from the server includes the following steps of:

In step S710: identity characteristic data sent by the UAV is received.

Specifically, the identity characteristic data includes an identity ID and a current IP address of the UAV. The server is in communication with the UAV and receives the identity ID and the current IP address sent by the UAV after being in communication with the Internet.

In step S720: a task data table matching the UAV according to the identity characteristic data is obtained.

Specifically, the server inquires the preset task data table according to the received identity ID, and detects the same portion between the identity ID of the task data table and the received identity ID.

In step S730: a task instruction is generated according to the task data table.

Specifically, the server generates the task instruction according to the task data table matching the identity ID. The task instruction includes specific data that required to be operated or implemented by the current UAV, and the specific data is obtained according to the task data table.

In step S740: the task instruction is sent to the UAV.

Specifically, the server sends the task instruction to the UAV according to the current IP address of the UAV, and the UAV performs the task corresponding to the task instruction.

Figure 8:
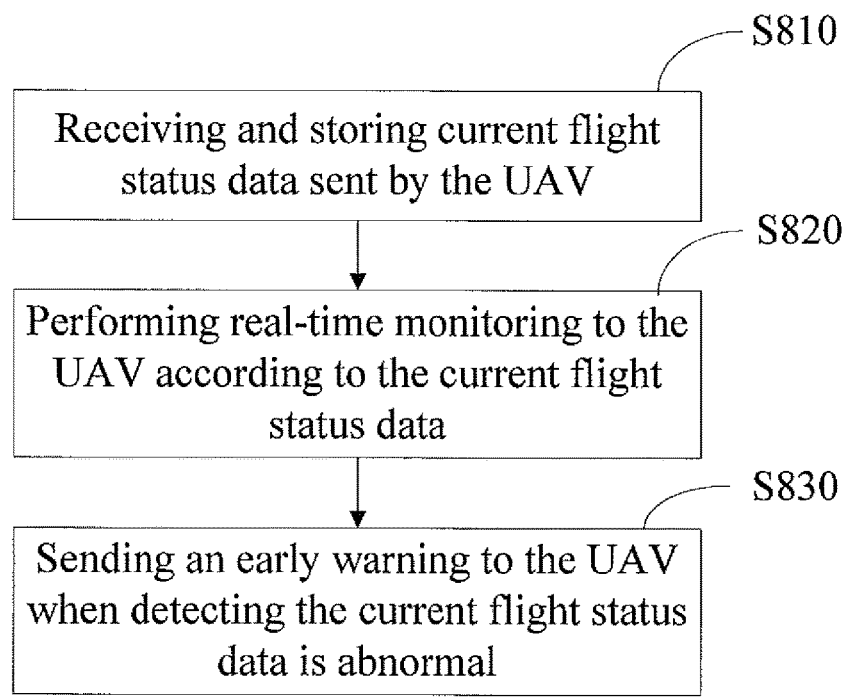
FIG. 8 is a flowchart illustrating the server performs real-time monitoring to the server according to an embodiment.

As shown in FIG. 8, According to one embodiment, after receiving the identity characteristic data sent by the UAV, the method further comprises the following steps of:

In step S810: current flight status data sent by the UAV is received and stored.

Specifically, the current flight status data comprises hardware status data, real-time location data, real-time motion data, real-time attitude data, sensor data, and self-test data.

In step S820: real-time monitoring to the UAV according to the current flight status data is performed.

In step S830: an early warning is sent to the UAV when detecting the current flight status data is abnormal.

Specifically, the server sends the early warning to the UAV according to the current flight status data of the UAV. The UAV sends the current flight state data to the server 200 at regular intervals, which may be a preset time interval, such as 5 s (seconds), 10 s, 1 min (minutes), and so on, so as to ensure that the current flight state data is real-time. The server performs monitoring and sending the early warning to the UAV according to the current flight status data, which facilitates the instant adjustment of the UAV and exception handling, for example, when the UAV has yawed, has entered into the sensitive area, or has been in the abnormal take-off status. When the server detects that the current flight state data of the UAV is abnormal, instructions may be issued to the UAV for suspension, termination, returning or forced landing at any time.

Figure 9:
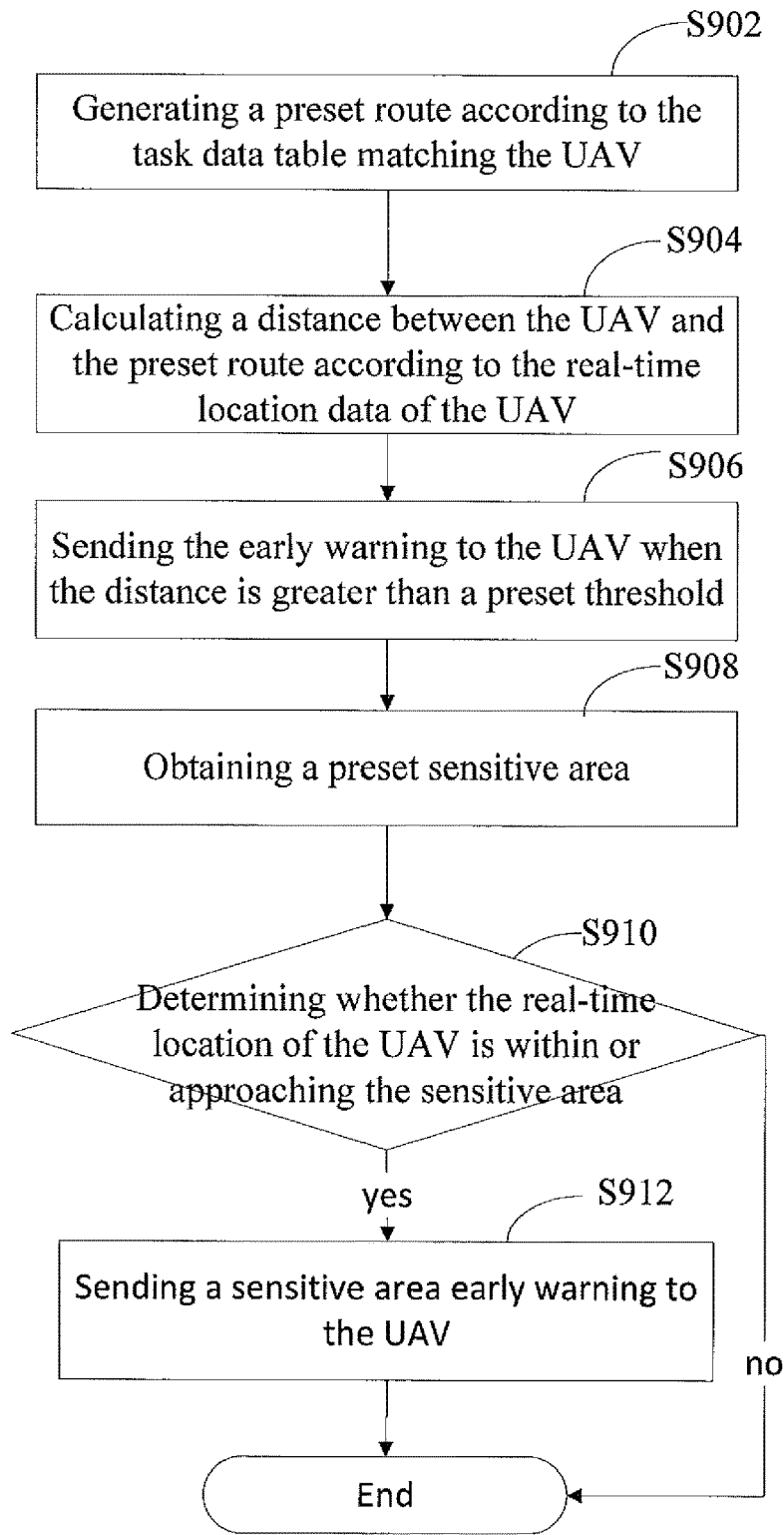
FIG. 9 is a flowchart illustrating the server sends an early warning to the server according to an embodiment.

According to one embodiment, as shown in FIG. 9, the step S830 specifically includes the following steps of:

In step S902: a preset route is generated according to the task data table matching the UAV.

Specifically, the server generates the reset route according to the waypoint data of the task data table matching the identity ID of the UAV.

In step S904: a distance between the UAV and the preset route is calculated according to the real-time location data of the UAV.

Specifically, the server calculates the distance between the UAV and the preset route.

In step S906: an early warning is sent to the UAV when the distance is greater than the threshold.

Specifically, the UAV is at the flight point i, then the geographic segment L (i, i−1) can be obtained, the preset threshold can be 20, 30 meters and other values, and then calculate the distance between the geographical segment and the preset route, or obtain the coordinates of the flight point directly, and calculate the distance between the UAV and the preset route according to a distance algorithm of point to line. When the distance is greater than the threshold, the early warning to the UAV. When the UAV has yawed, the server can issue an adjustment instructions, or the corresponding UAV is adjusted manually.

In step S908: a preset sensitive area is obtained.

Specifically, the server may establish a sensitive area database to store the preset sensitive area including an airport, a military zone and so on.

In step S910: determining whether the real-time location of the UAV is within or approaching the sensitive area; if so, performing the step S912, or else ending the process.

Specifically, the server can calculate the distance (in meters) between the real-time location of the UAV and the sensitive area by taking advantage of a distance algorithm between points and points and a distance algorithm between points and lines in geometric matrices and the Earth's radius value. When the distance of the UAV is smaller than the preset distance, it is considered that the UAV is approaching the sensitive area, where the preset distance can be 10, 5 meters and so on. When the UAV is within or approaching the sensitive area, the early warning is sent to the UAV. The server may also issue a temporary task instruction to the UAV to change the original route away from the sensitive area. For example, the original route of the UAV is A-B, which will pass through the sensitive area in the half way, a temporary waypoint C can be added, so that the route becomes A-C-B, thus avoiding the sensitive area. When the UAV is within or approaching the sensitive area, the server can issue the adjustment instructions automatically, or the corresponding UAV is adjusted manually.

In step S912: a sensitive area early warning is sent to the UAV.

Figure 10:
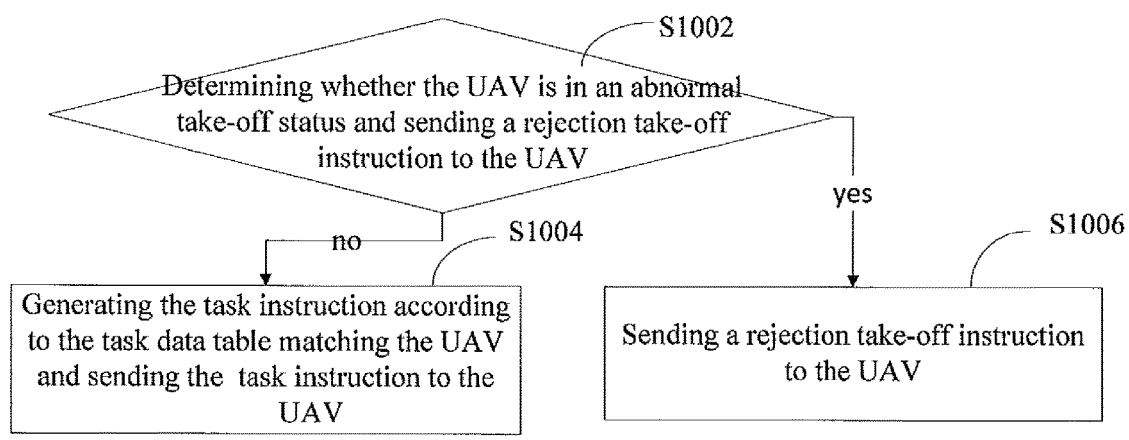
FIG. 10 is a flowchart illustrating the server determines whether the UAV is in an abnormal take-off status according to an embodiment.

As shown in FIG. 10, According to one embodiment, the foregoing method of scheduling the UAV further includes the following steps of:

In step S1002: whether the UAV is in an abnormal status is determined, if so, performing the step S1006, or else performing the step S1004.

Specifically, the abnormal take-off status includes one or more of the following: (1) The UAV being in a non-execution task status determined according to the task data table, i.e. there is no data in the task data table matching the UAV. (2) The UAV being not in a take-off area calculated and determined according to current location data of the UAV. The distance between the current location data of the UAV and the take-off point is calculated according to the latitude and longitude information, the waypoint type of which is take-off point geographical location, corresponding to the UAV 100 in the task data table. When the distance is smaller than the preset range, the preset range may be 5, 3 meters, and so on, indicating that the UAV 100 is within the take-off area, otherwise the UAV is not within the take-off area. (3) The UAV being in the sensitive area calculated and determined according to the current location data of the UAV 100. (4) The self-test data of the UAV being abnormal, such as abnormal operating voltage, abnormal temperature and so on.

In step S1004: the task instruction is generated according to the task data table matching the UAV and is sent to the UAV.

Specifically, the server can preload the task data table, or load the task data table one by one or update the task data table in real time according to an actual application environment. The two methods can be selected according to the actual application scene and network environment of the UAV.

In step S1006: a rejection take-off instruction is sent to the UAV.

Specifically, the server sends the rejection take-off instruction to the UAV when the UAV is in an abnormal flight status, which facilitates adjustment of the UAV.

Figure 11:
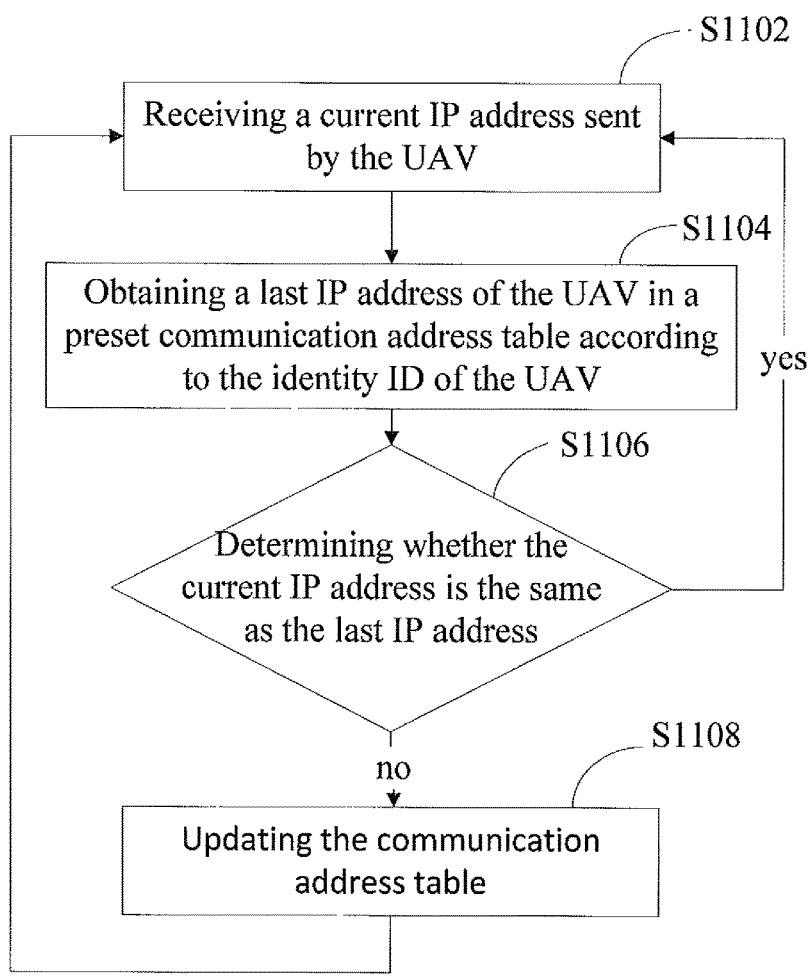
FIG. 11 is a flowchart illustrating the server obtains an IP of the UAV according to an embodiment.

As shown in FIG. 11, According to one embodiment, the method of scheduling the UAV further includes the following steps of:

In step 1102: the current IP address is obtained.

Specifically, during the flying of the UAV, the current IP address of the UAV may be changed when a base station is switched, so that the UAV needs to obtain its current IP address in real time and send the current IP address to the server.

In step 1104: a last IP address of the UAV in a preset communication address table is obtained according to the identity ID of the UAV.

The communication address table records the association relationship between the identity ID of the UAV 100 and the current IP address. The communication address table is shown as follows:

| Identity ID | IP address |
| --- | --- |

In step 1106: whether the current IP address is the same as the last IP address is determined, if so, performing the step S1102, or else performing a step S1108.

When the server detects that the current IP address sent by the UAV is different from the IP address corresponding to its identity ID in the communication address table, thereby updating the communication address table. The server sends the task instruction according to the current IP address of the UAV, so as to control the specified UAV to perform the task corresponding to the task instruction.

In step S1108: the communication address table is updated.

According to one embodiment, the forgoing method of scheduling the UAV further includes the following steps of:

(1) A control instruction for the UAV sent by a terminal is received.

Specifically, the terminal can be mobile phones, laptops, tablet PC, desktop computers and other terminal equipment. The terminal can be in communication with the server via the Internet and send the control instruction of the UAV to the server to achieve the scheduling of the UAV.

(2) The identity characteristic data of the UAV is determined according to the control instruction.

(3) The control instruction is sent to the UAV corresponding to the determined identity characteristic data of the UAV.

Specifically, the server determines the identity ID and the current IP address of the UAV according to the control instruction sent by the terminal and sends the control instruction to the corresponding UAV.

The foregoing implementations are merely specific embodiments of the present disclosure, but are not intended to limit the protection scope of the present disclosure. It should be noted that persons skilled in the art can understand and embody all or part of flowcharts of the above implementations. Equivalent variation figured out by persons skilled in the art shall all fall within the protection scope of the present disclosure.

What is claimed is:

1. A method of scheduling an unmnanned aerial vehicle (UAV), comprising the following steps of:
   receiving identity characteristic data sent by the UAV;
   obtaining a task data table matching the UAV according to the identity characteristic data;
   generating a task instruction according to the task data table;
   sending the task instruction to the UAV;
   transmitting current time flight status date transmitted by the UAV, wherein the current flight status data comprises hardware status data, real-time location data, real-time motion data, real-time attitude data, sensor data, and self-test data;
   receiving and storing the current flight status data sent by the UAV;
   performing real-time monitoring to the UAV according to the current flight status data;
   comparing the current flight status data to a preset data range;
   sending an early warning to the UAV when detecting the current flight status data is abnormal;
   adjusting operating parameters by the UAV when the current flight status data is abnormal and below a threshold value; and
   transmitting adjustment instructions to the UAV when the current flight status data is abnormal and above the threshold value.

2. The method of scheduling the UAV of claim 1, wherein sending the early warning to the UAV when detecting the current flight status data is abnormal specifically comprises the following steps of:
   generating a preset route according to the task data table matching the UAV;
   calculating a distance between the UAV and the preset route according to the real-time location data of the UAV; and
   sending the early warning to the UAV when the distance is greater than a preset threshold.

3. The method of scheduling the UAV of claim 2, wherein sending the early warning to the UAV when detecting that the current flight status data is abnormal further comprises the following steps of:
   obtaining a preset sensitive area;
   determining whether the real-time location of the UAV is within or approaching the sensitive area; and
   sending a sensitive area early warning to the UAV if the real-time location of the UAV is within or approaching the sensitive area.

4. The method of scheduling the UAV of claim 3, wherein sending the early warning to the UAV when detecting the current flight status data is abnormal further comprises the following steps of:

determining that the UAV is in an abnormal take-off status and sending a rejection take-off instruction to the UAV; or else generating the task instruction according to the task data table matching the UAV and sending the task instruction to the UAV;

wherein the abnormal take-off status comprises one or more of the following: the UAV being in a non-execution task status determined according to the task data table; the UAV being not in a take-off area calculated and determined according to current location data of the UAV; the UAV being in the sensitive area calculated and determined according to the current location data of the UAV; and the self-test data of the UAV being abnormal.

5. The method of scheduling the UAV of claim 1, wherein the identity characteristic data comprises an identity ID and a current Internet Protocol (IP) address of the UAV, the method further comprises the following steps of:

obtaining a last IP address of the UAV in a preset communication address table according to the identity ID of the UAV, wherein the communication address table records an association relationship between the identity ID and the IP address;

determining that the current IP address is the same as the last IP address and continuing to receive the current IP address sent by the UAV; or else updating the communication address table.

6. The method of scheduling the UAV of claim 1, wherein the method further comprises the following steps of:

receiving a control instruction for the UAV sent by a terminal;

determining the identity characteristic data of the UAV according to the control instruction; and sending the control instruction to the UAV corresponding to the determined identity characteristic data of the UAV.

7. An unmanned aerial vehicle (UAV), comprising:

a flight control module storing an identity ID of the UAV;

a communication module in communication with the flight control module obtaining and storing a current IP address; and a data collecting module in communication with the flight control module;

wherein the communication module sends the identity ID and the current IP address to a server and receives a task instruction sent by the server and matching the identity ID, wherein the task instruction is generated by the server according to a preset task data table;

wherein the flight control module receives the task instruction transmitted by the communication module and performs a task corresponding to the task instruction;

wherein the data collecting module obtains current flight status data, sends the current flight status data to the server via the communication module, thus enabling the server to perform real-time monitoring to the current flight status, wherein the current flight status data comprises hardware status data, real-time location data, real-time motion data, real-time attitude data, sensor data, and self-test data; the data collecting module comparing the current flight status data to a preset data range and adjusting operating parameters when the current flight status data is abnormal and below a threshold value;

wherein the server transmits adjustment instructions to the UAV when the current flight status data is abnormal and above the threshold value.

8. The UAV of claim 7, wherein the data collecting module detects the hardware status data, the real-time location data, the real-time motion data, the real-time attitude data, and the sensor data are within a preset normal value range and generates the self-test data according to the detecting result;

the data collecting module prompts the flight status is abnormal when having determined the hardware status data, the real-time location data, the real-time motion data, the real-time attitude data, and the sensor data are not within the preset normal value range.

9. The UAV of claim 8, wherein the flight control module performs a take-off operation and receives the task instruction sent by the server in real time, and performs the task corresponding to the task instruction when determining, the UAV is in a normal take-off status;

wherein the flight control module receives a rejection take-off instruction sent by the server via the communication module and prompts a user according to the rejection take-off instruction when determining the UAV is in an abnormal take-off status.

* * * * *